United States Patent
Franklin et al.

(10) Patent No.: US 12,530,666 B2
(45) Date of Patent: Jan. 20, 2026

(54) INTERACTIVE TRANSACTION TRACKER

(71) Applicant: Capital One Services, LLC, McLean, VA (US)

(72) Inventors: Keegan Franklin, Tucson, AZ (US); Aeman Jamali, Indianapolis, IN (US); Jordan Arrieta, Wilmington, DE (US); Megan Obrien, New Orleans, LA (US); Danielle Wegrzyn, Bear, DE (US); Michael Croghan, Herndon, VA (US); Kai Si, Monterey Park, CA (US); Sasha Ahrestani, Philadelphia, PA (US); Jillian Peifer, Sterling, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/766,185

(22) Filed: Jul. 8, 2024

(65) Prior Publication Data

US 2026/0010883 A1    Jan. 8, 2026

(51) Int. Cl.
*G06Q 20/10* (2012.01)

(52) U.S. Cl.
CPC .................................. *G06Q 20/108* (2013.01)

(58) Field of Classification Search
CPC .................................................... G06Q 20/108
See application file for complete search history.

(56) References Cited

U.S. PATENT DOCUMENTS

| | | |
|---|---|---|
| 5,515,451 A | 5/1996 | Tsuji et al. |
| 7,391,934 B2 | 6/2008 | Goodall et al. |
| 7,421,107 B2 | 9/2008 | Lugg |
| 7,526,117 B2 | 4/2009 | Foth et al. |
| 7,587,066 B2 | 9/2009 | Cordery et al. |
| 7,698,222 B1 | 4/2010 | Bueche |
| 7,702,588 B2 | 4/2010 | Gilder et al. |
| 7,734,545 B1 | 6/2010 | Fogliano et al. |
| 7,818,307 B1 | 10/2010 | Young et al. |

(Continued)

FOREIGN PATENT DOCUMENTS

| | | | | |
|---|---|---|---|---|
| CN | 112101683 A | * | 12/2020 | ............. G06Q 10/04 |
| GB | 2469928 A | * | 11/2010 | ............... G07F 9/02 |

(Continued)

OTHER PUBLICATIONS

Capital One Tech: How Machine Learning can Help Fight Money Laundering, Sep. 22, 2021, Capital One, pp. 1-9 (Year: 2021).*

(Continued)

*Primary Examiner* — Bijendra K Shrestha
(74) *Attorney, Agent, or Firm* — Sterne, Kessler, Goldstein & Fox P.L.L.C.

(57) ABSTRACT

A computer implemented method, system and non-transitory computer-readable device for a remote deposit environment. An interactive User Interface (UI), provides status indicators and remediation steps throughout and after the remote deposit process. A first trained machine learning model, predicts an occurrence of a remote deposit matter preventing advancement of the remote deposit process. A second trained machine learning model predicts one or more remote deposit remediation tasks to overcome the remote deposit matter. The remote deposit remediation tasks are displayed to the user for completion to advance the remote deposit process.

14 Claims, 9 Drawing Sheets

(56) References Cited

U.S. PATENT DOCUMENTS

| | | |
|---|---|---|
| 7,856,402 B1 | 12/2010 | Kay |
| 7,905,396 B2 | 3/2011 | Tidwell et al. |
| 7,949,587 B1 | 5/2011 | Morris et al. |
| 8,027,928 B1 | 9/2011 | Hecht, Jr. et al. |
| 8,050,997 B1 | 11/2011 | Nosek et al. |
| 8,060,442 B1 | 11/2011 | Hecht et al. |
| 8,104,676 B2 | 1/2012 | Ramachandran |
| 8,213,782 B2 | 7/2012 | Jelinek |
| 8,271,381 B2 | 9/2012 | O'Brien et al. |
| 8,290,876 B1 | 10/2012 | Powell |
| 8,296,230 B2 | 10/2012 | Davis et al. |
| 8,300,917 B2 | 10/2012 | Borgia et al. |
| 8,332,329 B1 | 12/2012 | Thiele |
| 8,406,500 B2 | 3/2013 | Najari et al. |
| 8,464,933 B1 | 6/2013 | Prasad et al. |
| 8,582,862 B2 | 11/2013 | Nepomniachtchi et al. |
| 8,605,982 B2 | 12/2013 | Jackson et al. |
| 8,626,661 B2 | 1/2014 | Gilder |
| 8,632,001 B1 | 1/2014 | Ramachandran et al. |
| 8,638,363 B2 | 1/2014 | King et al. |
| 8,639,105 B2 | 1/2014 | Ogino |
| 8,708,227 B1 | 4/2014 | Oakes, III et al. |
| 8,745,073 B2 | 6/2014 | Mulligan et al. |
| 8,811,711 B2 | 8/2014 | Calman et al. |
| 8,885,963 B2 | 11/2014 | Coleman |
| 8,958,605 B2 | 2/2015 | Amtrup et al. |
| 8,959,033 B1 | 2/2015 | Oakes, III et al. |
| 8,983,170 B2 | 3/2015 | Nepomniachtchi et al. |
| 8,995,012 B2 | 3/2015 | Heit et al. |
| 9,064,248 B2 | 6/2015 | Huff et al. |
| 9,324,073 B2 | 4/2016 | Nepomniachtchi et al. |
| 9,384,392 B2 | 7/2016 | Weber et al. |
| 9,483,761 B2 | 11/2016 | Brendell et al. |
| 9,558,493 B2 | 1/2017 | Carrott |
| 9,569,756 B1 | 2/2017 | Bueche, Jr. et al. |
| 9,640,041 B2 | 5/2017 | Block et al. |
| 9,652,690 B2 | 5/2017 | Eid et al. |
| 9,672,510 B2 | 6/2017 | Roach et al. |
| 9,679,281 B2 | 6/2017 | Moshal |
| 9,684,920 B2 | 6/2017 | Kalgi et al. |
| 9,721,177 B2 | 8/2017 | Lee et al. |
| 9,747,509 B2 | 8/2017 | Eid et al. |
| 9,779,392 B1 | 10/2017 | Prasad et al. |
| 9,807,263 B2 | 10/2017 | Bala et al. |
| 9,852,406 B2 | 12/2017 | Doyle et al. |
| 9,852,409 B2 | 12/2017 | Artman et al. |
| 10,026,119 B2 | 7/2018 | Green et al. |
| 10,192,108 B2 | 1/2019 | Nepomniachtchi et al. |
| 10,210,522 B1 | 2/2019 | Medina, III et al. |
| 10,217,375 B2 | 2/2019 | Waldron et al. |
| 10,402,790 B1 | 9/2019 | Clark et al. |
| 10,460,381 B1 | 10/2019 | Pollack et al. |
| 10,504,185 B1 | 12/2019 | Buentello |
| 10,552,810 B1 | 2/2020 | Ethington et al. |
| 10,635,898 B1 | 4/2020 | Pribble et al. |
| 10,692,230 B2 | 6/2020 | Anderson et al. |
| 10,699,146 B2 | 6/2020 | Shustorovich et al. |
| 10,706,466 B1 | 7/2020 | Ethington et al. |
| 10,762,579 B2 | 9/2020 | Riechers et al. |
| 10,769,598 B1 | 9/2020 | Oakes, III et al. |
| 10,789,496 B2 | 9/2020 | Kotovich et al. |
| 10,853,771 B2 | 12/2020 | Enobakhare |
| 10,855,914 B1 | 12/2020 | Prasad et al. |
| 10,909,362 B2 | 2/2021 | Nepomniachtchi et al. |
| 11,064,111 B1 | 7/2021 | Prasad et al. |
| 11,068,867 B1 | 7/2021 | Tucker |
| 11,126,975 B2 | 9/2021 | Haldenby et al. |
| 11,127,008 B1 | 9/2021 | Buentello et al. |
| 11,145,169 B2 | 10/2021 | Pratten et al. |
| 11,157,731 B2 | 10/2021 | Nepomniachtchi et al. |
| 11,159,733 B2 | 10/2021 | Mukul |
| 11,200,550 B1 | 12/2021 | Singfield |
| 11,210,379 B1 | 12/2021 | Lindley et al. |
| 11,216,884 B1 | 1/2022 | Buentello |
| 11,222,313 B2 | 1/2022 | Doyle et al. |
| 11,244,302 B2 | 2/2022 | Ekpenyong et al. |
| 11,244,319 B2 | 2/2022 | Navarro et al. |
| 11,282,086 B1 | 3/2022 | Medina, III et al. |
| 11,288,661 B2 | 3/2022 | Hammad et al. |
| 11,295,377 B1 | 4/2022 | Ethington et al. |
| 11,295,378 B1 | 4/2022 | Voutour et al. |
| 11,315,217 B2 | 4/2022 | Ilic et al. |
| 11,321,709 B1 | 5/2022 | Kolchin |
| 11,373,150 B1 | 6/2022 | Bueche, Jr. et al. |
| 11,449,841 B1 | 9/2022 | Srinivasarangan et al. |
| 11,516,383 B2 | 11/2022 | Ilic et al. |
| 11,531,973 B1 | 12/2022 | Prasad et al. |
| 11,539,848 B2 | 12/2022 | Roach et al. |
| 11,562,332 B1 | 1/2023 | Oakes, III et al. |
| 11,610,294 B2 | 3/2023 | Dewitt et al. |
| 11,640,627 B2 | 5/2023 | Fotso et al. |
| 11,656,932 B2 * | 5/2023 | Mahamuni ............ G06F 11/3409 714/48 |
| 11,676,285 B1 | 6/2023 | Backlund et al. |
| 11,682,222 B1 | 6/2023 | Oakes, III et al. |
| 11,694,268 B1 | 7/2023 | Buentello |
| 11,704,627 B2 | 7/2023 | Gordon et al. |
| 11,710,210 B1 | 7/2023 | Medina, III |
| 11,798,253 B2 | 10/2023 | Pribble et al. |
| 11,810,382 B2 | 11/2023 | Laza et al. |
| 11,829,962 B2 | 11/2023 | Burnam et al. |
| 11,900,755 B1 | 2/2024 | Bueche, Jr. |
| 2005/0283444 A1 | 12/2005 | Ekberg |
| 2006/0036537 A1 | 2/2006 | Lawrence et al. |
| 2008/0140579 A1 | 6/2008 | Agarwal |
| 2009/0171839 A1 | 7/2009 | Rosano et al. |
| 2012/0040717 A1 | 2/2012 | Levy et al. |
| 2013/0013491 A1 | 1/2013 | Selway et al. |
| 2013/0054461 A1 | 2/2013 | Gupta et al. |
| 2013/0176473 A1 | 7/2013 | Ogino |
| 2013/0198069 A1 | 8/2013 | Latimer |
| 2013/0204783 A1 | 8/2013 | Klose et al. |
| 2014/0074697 A1 | 3/2014 | Foster |
| 2014/0114852 A1 | 4/2014 | Rajagopal et al. |
| 2014/0122332 A1 | 5/2014 | Viera et al. |
| 2014/0236767 A1 | 8/2014 | Duggal et al. |
| 2015/0032626 A1 | 1/2015 | Dill et al. |
| 2015/0120564 A1 | 4/2015 | Smith et al. |
| 2017/0270508 A1 | 9/2017 | Roach et al. |
| 2017/0309108 A1 | 10/2017 | Sadovsky et al. |
| 2017/0336511 A1 | 11/2017 | Nerurkar |
| 2018/0234472 A1 | 8/2018 | Malakar |
| 2020/0042955 A1 | 2/2020 | Widdows |
| 2020/0334647 A1 | 10/2020 | Malhotra et al. |
| 2020/0389600 A1 | 12/2020 | Capurso et al. |
| 2021/0174361 A1 | 6/2021 | Potireddy et al. |
| 2021/0360149 A1 | 11/2021 | Mukul |
| 2022/0245985 A1 | 8/2022 | Bhutani et al. |
| 2022/0277291 A1 | 9/2022 | Roongta et al. |
| 2022/0335393 A1 | 10/2022 | Gupta et al. |
| 2022/0343301 A1 | 10/2022 | Edwards et al. |
| 2022/0358575 A1 | 11/2022 | Smith |
| 2023/0060395 A1 | 3/2023 | Roach et al. |
| 2023/0060464 A1 | 3/2023 | Ceesay |
| 2023/0084370 A1 | 3/2023 | Bradford |
| 2023/0120865 A1 | 4/2023 | Nascimento et al. |
| 2023/0133158 A1 | 5/2023 | Kolchin |
| 2023/0196319 A1 | 6/2023 | Ng et al. |
| 2023/0196706 A1 | 6/2023 | Scott |
| 2023/0209116 A1 | 6/2023 | Leung et al. |
| 2023/0281629 A1 | 9/2023 | Shevyrev et al. |
| 2023/0289808 A1 * | 9/2023 | Kolchin ............ G06Q 20/0855 |

(56) References Cited

U.S. PATENT DOCUMENTS

| | | | |
|---|---|---|---|
| 2023/0351782 A1 | 11/2023 | Fitzgerald | |
| 2024/0202686 A1* | 6/2024 | Creel | ................ G06Q 20/3224 |

FOREIGN PATENT DOCUMENTS

| | | |
|---|---|---|
| JP | 2020021419 A | 2/2020 |
| KR | 2570769 B1 | 8/2023 |

OTHER PUBLICATIONS

Malik et al.: Remote Check Truncation Systems: Vulnerability Analysis and Countermeasures, Feb. 7, 2020, vol. 8, IEEE Access, pp. 59485-59510 (Year: 2020).*

Mitek: How does machine learning help with fraud detection in bnks? Nov. 2, 2021, pp. 1-4 (Year: 2021).*

Rose, Lydia M. "Modernizing check fraud detection with machine learning." PhD dissertation. Utica College. 2018.

remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e-_2018_2_14_12_52_3.pdf, [site visited on May 19, 2023], pp. 1-2.

Bills, Steve, "Automated Amount Scanning Is Trend in Remote-Deposit," American Banker, New York, NY, Aug. 30, 2005, (4 pgs).

Dunga et al. "Electronic Booking and Payment Platforms for Inter-Campus E-Bikes". Engineering Proceedings. Jul. 14, 2023. pp. 1-14. vol. 41, Issue 12.

Aletihadpayments. "Aani | Split the bill with your friends". Oct. 16, 2023. Located via YouTube, free copy available at https://www.youtube.com/watch?v=_wys12-0KmE.

Katariya. "Mastering QR Code Payments: A Guide to Seamless and Effortless Transactions". Jun. 12, 2023. Located via Google Web, free copy available at https://www.mooninvoice.com/blog/qr-code-payments/.

PayBy. "PayBy: Easily Split Bills of Group Expenses". Retrieved from the Internet on Dec. 21, 2023. Located via Google Web, free copy available at https://www.payby.com/split-bills.

Natwest. "Request money from someone or split a bill". Retrieved from the Internet on Dec. 21, 2023. Located via Google Web, free copy available at https://www.natwest.com/waystopay/payme.html.

Spoton. "QR Scan & Pay / Order & Pay | SpotOn Order". Jul. 19, 2023. Located via Google Web, free copy available at https://help.spoton.com/space/SK/2457829381/QR+Scan+%26+Pay+%2F+Order+%26+Pay+%7C+SpotOn+Order.

SpotOn. "QR Split Payment | SpotOn Order". Jul. 19, 2023. Located via Google Web, free copy available at https://help.spoton.com/space/SK/2262565040/QR+Split+Payment+%7C+SpotOn+Order.

photo.stackexchange.com, "What of those EXIF values tell me more about my image's quality?" Jul. 8, 2017, Photography Stack Exchange, Located via Google Web, available at https://photo.stackexchange.com/questions/90730/what-of-those-exif-values-tell-me-more-about-my-images-quality.

Abraham, "Moiré Pattern Detection using Wavelet Decomposition and Convolutional Neural Network," Amadeus Software Labs Pvt. Ltd, IEEE (2018).

Yang, et al., "Doing More with Moiré Pattern Detection in Digital Photos," Journal of Latex Class Files, vol. 14, No. 8 (Aug. 2021).

Digital Check, "Money Orders Giving You Trouble? We've Got the Solution!" Oct. 1, 2008. Located via Google Web, available at https://www.digitalcheck.com/moneyorders-dcom/.

* cited by examiner

INTERACTIVE TRANSACTION TRACKER

BACKGROUND

As financial technology evolves, banks, credit unions and other financial institutions have found ways to make online banking and digital money management more convenient for users. Mobile banking apps may let you check account balances and transfer money from your mobile device. In addition, a user may deposit paper checks from virtually anywhere using their smartphone or tablet. However, users may have little or no insight into a status of a remote deposit before its completion.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
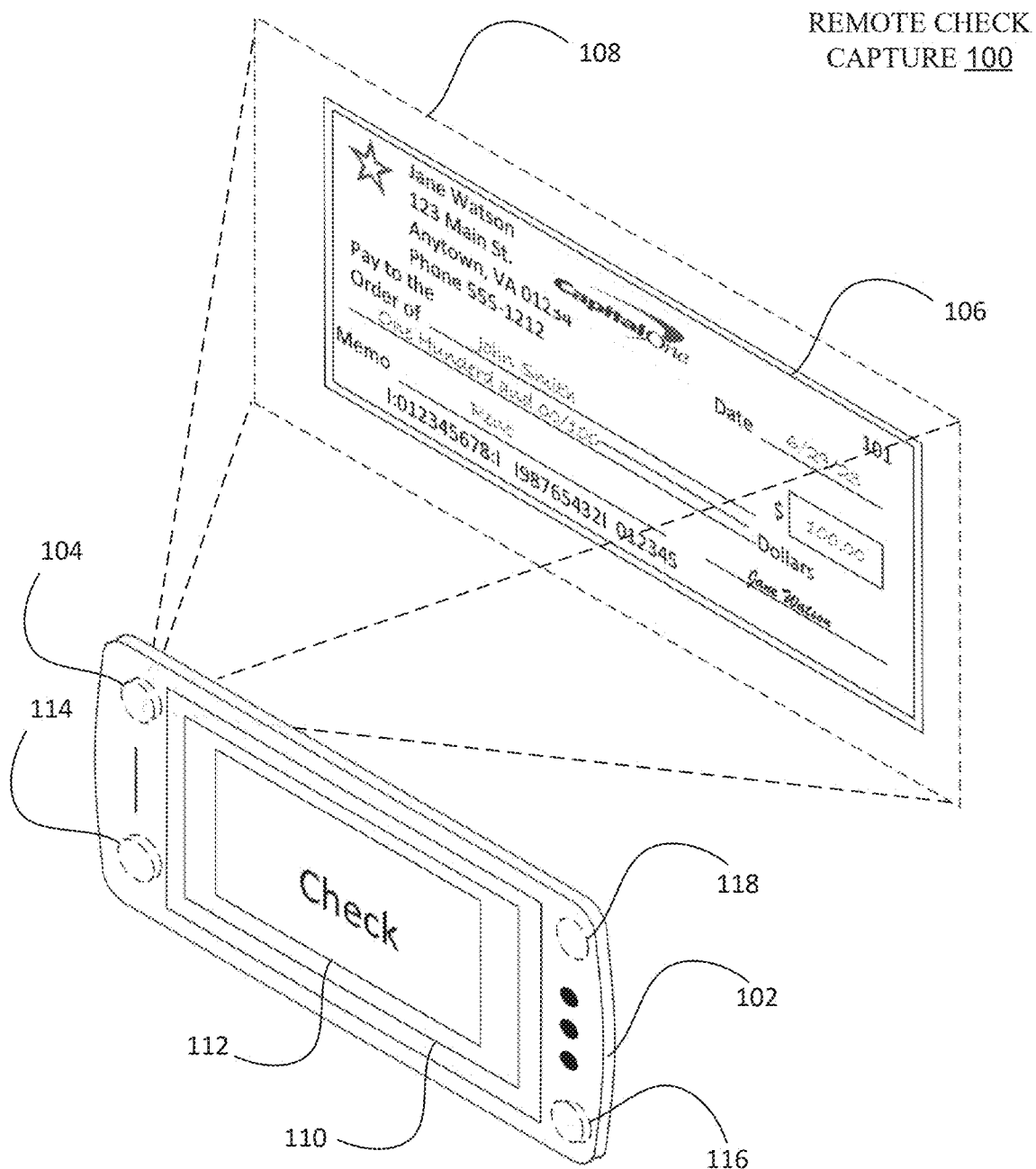
FIG. 1 illustrates an example remote deposit check capture, according to some embodiments and aspects.

Disclosed herein are system, apparatus, device, method and/or computer program product embodiments, and/or combinations and sub-combinations thereof for implementing real-time remote deposit tracking and remediation to assist, in real-time, a bank customer remotely depositing a financial instrument, such as a check.

Mobile check deposit is a convenient way to deposit funds using a customer's mobile device or laptop. As technology and digital money management tools continue to evolve, the process has become safer and easier. Mobile check deposit is a way to deposit a financial instrument, e.g., a paper check, through a banking app using a smartphone, tablet, laptop, etc. In current systems, mobile deposit may request a user to process a plurality of pictures of a check using, for example, their smartphone or tablet camera and upload them through a mobile banking app running on the mobile device. Deposits commonly include personal, business, or government checks. However, users may have little or no insight into a status of a remote deposit before its completion.

In current remote deposit systems and processes, computer-based (e.g., laptop) or mobile-based (e.g., mobile device) technology allows a user to initiate a document uploading process for uploading an image(s) or other electronic versions of a document to a backend system (e.g., a document processing system) for various purposes, including evaluating the quality of the captured image(s). This current process has disadvantages, such as, requiring the customer to capture and communicate check imagery and, if determined to be of poor quality, following-up with additional images. For example, a poor contrasting background surface visibly encapsulating at least a portion of the check may prevent or hinder a determination or capture of the check boundaries or content within these boundaries. In another example, too much ambient light (e.g., to include reflections), or too little ambient light (e.g., dark) may reduce the quality of imagery. This low quality imagery may be inefficient and consume client, system, and network resources that otherwise could be allocated to other tasks. Alternatively, without an awareness of potential problems or an ability to rectify these problems, a frustrated user may take their deposit to another financial institution, causing a potential duplicate presentment or fraud issue.

In one aspect, an interactive transaction tracker, manages remote deposit processing sequences. For example, the customer initiates a remote deposit process by opening an application (app) and then making a request to deposit a check. During the process, one or more errors or status changes occur. For example, a hold may be placed on the check based on incomplete or inaccurate information. In current systems, the depositor's choices may be limited to cancelling the transaction, waiting for the hold to clear or contacting the bank for additional information. Without a clearer, more granular understanding of the process and issues, both positive and negative, the depositor has little recourse on how to make remediation efforts in real-time. In one aspect, the interactive transaction tracker is a multi-level graphical User Interface (UI). For example, progress indicators may display a current status at a high level of check processing. In a non-limiting example, the high levels may be three graphical indicators. A first graphical indicator may display a status of check image processing (e.g., camera functions, OCR, communications, etc.). A second graphical indicator may display a status of the deposit. And, a third graphical indicator may display a status of post deposit activities (e.g., funds availability schedules, potential fraud, denial of funds, etc.). When an error occurs in any of the higher level groups, a more detailed indicator (e.g., drop-down menu) will provide the user with additional information, as well as provide remediation options associated with correcting the problem. While user remediation steps may be described herein, the client or server systems may also automatically process one or more remediation actions or combine with the user to remediate errors. The various status indicators and remediation processes described herein may be directed by a mobile banking app and/or remote server system.

The technology described herein provides a technical solution to cancelled or duplicate remote deposit transactions caused by not providing the customer real-time status updates and associated remediation steps for matters (e.g., issues or problems) that may arise during or after the remote deposit. The technology described herein provides a technical solution of generating a UI with dynamically selected and rendered levels of continuously updated (e.g., real-time) status updates and associated remediation steps for matters (e.g., issues or problems) that may occur during or after the remote deposit. For example, for expedience purposes, the user may be presented with only a highest or first level of status updates unless a negative status occurs (e.g., an error or other processing issue). When the status changes from positive to negative, the UI as described herein, may include a more detailed level of these issues, both at the processing stage level as well as at the specific error or remediation step level. In this manner, the technical solution, improves the UI itself.

The technical solution improves a likelihood of real-time completion of a remote deposit and thus is more efficient, requires less client, system, and network resources, improves user experience, and may reduce instances of fraud and accidental duplicate check presentation. In addition, as the problem exists in the computer realm, it follows that a computer-based solution is required. In some embodiments, the technology described herein continuously evaluates a remote deposit status of client-side and server side remote deposit processing.

In some embodiments, a client device camera continuously streams live imagery for one or more sides a check until all of the data fields have been extracted from the imagery. In some embodiments, various check framing elements, such as a border or corners, may assist in alignment of continuously streamed check data fields, position of corresponding Byte Array Output Video stream objects, and/or flip detection. In some embodiments, success of an OCR extraction process may be determined based on reaching an extraction quality threshold. For example, if a trained machine learning (ML) OCR model reaches a determination of 85% surety of a correct data field extraction, then the OCR process for that field may be considered complete. Utilizing this capability, the OCR data may be communicated to a banking backend for additional remote deposit processing. Implementing the technology disclosed herein, the deposit may be processed by a mobile banking app and a remote deposit status rendered on a user interface (UI) mid-experience (for example, at or around the time that the user processes an image of the check for remote deposit). In some aspects, the UI may be continuously updated during and after the remote deposit process. Alternatively, or in addition to, portions of the remote deposit sequence may be processed locally on the client device.

Figure 3:
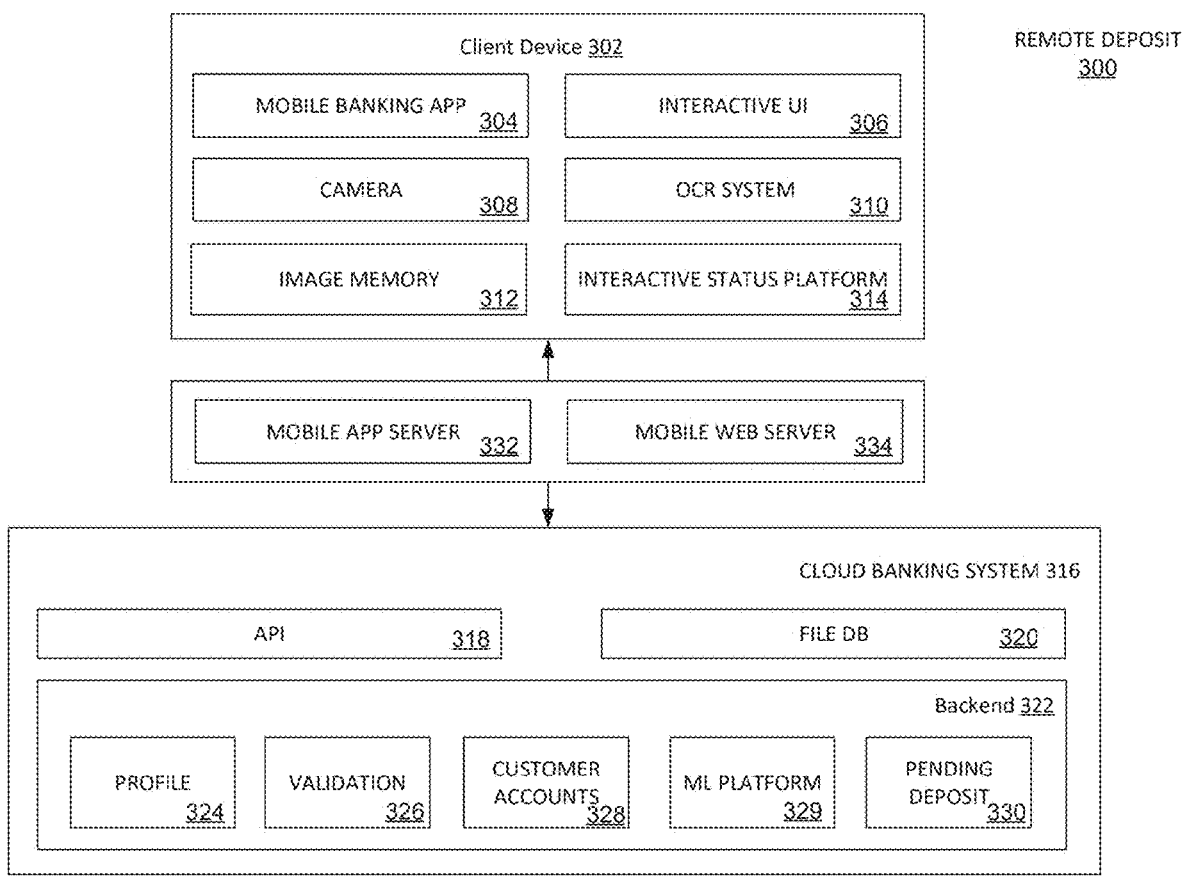
FIG. 3 illustrates a block diagram of a remote deposit system architecture, according to some embodiments and aspects.

Various aspects of this disclosure may be implemented using and/or may be part of the remote deposit system shown in FIG. 3. It is noted, however, that this environment is provided solely for illustrative purposes, and is not limiting. Aspects of this disclosure may be implemented using and/or may be part of environments different from and/or in addition to the remote deposit system, as will be appreciated by persons skilled in the relevant art(s) based on the teachings contained herein. An example of the remote deposit process and system shall now be described.

FIG. 1 illustrates an example remote check process 100, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Sample check 106, may be a personal check, paycheck, or government check, to name a few. In some embodiments, a customer will initiate a remote deposit check process from their mobile computing device (e.g., smartphone) 102, but other digital video camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is a personal check, the customer will select a bank account (e.g., checking or savings) into which the funds specified by the check are to be deposited. Content associated with the document include the funds or monetary amount to be deposited to the customer's account, the issuing bank, the routing number, and the account number. Content associated with the customer's account may include a risk profile associated with the account and the current balance of the account. Options associated with a remote deposit process may include continuing with the deposit process, remediating errors, or cancelling the deposit process, thereby cancelling depositing the check amount into the account.

Mobile computing device 102 may communicate with a bank or third party using a communication or network interface (not shown). Communication interface may communicate and interact with any combination of external devices, external networks, external entities, etc. For example, communication interface may allow mobile computing device 102 to communicate with external or remote devices over a communications path, which may be wired and/or wireless (or a combination thereof), and which may include any combination of LANs, WANs, the Internet, etc. Control logic and/or data may be transmitted to and from mobile computing device via a communication path that includes the Internet.

In an example approach, a customer will login to their mobile banking app, select the account they want to deposit a check into, then select, for example, a "deposit check" option that will activate their mobile device's camera 104 (e.g., open a camera port). One skilled in the art would understand that variations of this approach or functionally equivalent alternative approaches may be substituted to initiate a mobile deposit.

In a computing device with a camera, such as a smartphone or tablet, multiple cameras (each of which may have its own image sensor or which may share one or more image sensors) or camera lenses may be implemented to process imagery. For example, a smartphone may implement three cameras, each of which has a lens system and an image sensor. Each image sensor may be the same or the cameras may include different image sensors (e.g., every image sensor is 24 MP; the first camera has a 24 MP image sensor, the second camera has a 24 MP image sensor, and the third camera has a 12 MP image sensor; etc.). In the first camera, a first lens may be dedicated to imaging applications that can benefit from a longer focal length than standard lenses. For example, a telephoto lens generates a narrow field of view and a magnified image. In the second camera, a second lens may be dedicated to imaging applications that can benefit from wide images. For example, a wide lens may include a wider field-of-view to generate imagery with elongated features, while making closer objects appear larger. In the third camera, a third lens may be dedicated to imaging applications that can benefit from an ultra-wide field of view. For example, an ultra-wide lens may generate a field of view that includes a larger portion of an object or objects located within a user's environment. The individual lenses may work separately or in combination to provide a versatile image processing capability for the computing device. While described for three differing cameras or lenses, the number of cameras or lenses may vary, to include duplicate cameras or lenses, without departing from the scope of the technologies disclosed herein. In addition, the focal lengths of the lenses may be varied, the lenses may be grouped in any configuration, and they may be distributed along any surface, for example, a front surface and/or back surface of the computing device.

In some embodiments and aspects disclosed herein, the OCR process may be implemented with an active OCR process using a mobile device, instead of after submission of imagery to a backend remote deposit system. However, other known and future OCR applications may be substituted without departing from the scope of the technology disclosed herein.

Active OCR is further described in U.S. application Ser. No. 18/503,778, entitled "Active OCR," filed Nov. 7, 2023, and incorporated by reference in its entirety. Active OCR, includes performing OCR processing on image objects formed from a raw live video stream of image data originating from an activated camera on a client device. The image objects may include portions of a check or an entire image of the check. As a portion of a check image is formed into a byte array, it may be provided to the active OCR system to extract any data fields found within the byte array in real-time or near real-time. In a non-limiting example, if the live video streamed image data contains an upper right corner of a check formed in a byte array, the byte array may be processed by the active OCR system to extract the origination date of the check.

In one non-limiting example, active OCR processes may benefit from image object builds generated by one or more, or a combination of cameras or lenses. For example, multiple cameras or lenses may separately, or in combination, capture specific blocks of imagery for data fields located within a document that is present, at least in part, within the field of view of the cameras. In another example, multiple cameras or lenses may capture more light than a single camera or lens, resulting in better image quality. In another example, individual lenses, or a combination of lenses, may generate depth data for one or more objects located within a field of view of the camera.

Using the camera 104 function on the mobile computing device 102, the customer frames imagery (e.g., image frames or live video) from a field of view 108 that includes at least a portion of one side of a check 112. Typically, the camera's field of view 108 will include at least the perimeter and background of the check. However, any camera position that generates in-focus imagery of the various data fields located on a check may be considered. Resolution, distance, alignment, and lighting parameters may require movement of the mobile device until a proper view of a complete check, in-focus, has occurred. In some aspects, camera 104, LIDAR sensor 114, ambient light sensor 116, and/or gyroscope sensor 118, may process image, light, distance, and/or angular position to assist in detecting ambient light of the environment or a distance of the check, as will be described in greater detail herein.

An application running on the mobile computer device 102 may automatically generate proper framing of a check within the mobile banking app's graphically displayed field of view window 110, displayed on a User Interface (UI) instantiated by the mobile banking app. A person skilled in the art of remote deposit would be aware of common requirements and limitations and would understand that different approaches may be required based on the environment in which the check viewing occurs. For example, low light, bright light, or reflections may require specific remediation. Alternatively, the camera may be remote to the mobile computing device 102. In an alternative embodiment, the remote deposit is implemented on a desktop computing device with an accompanying digital camera.

A UI may display a graphic status indicator on a display of mobile computing device 102. Alternatively, or in addition to, the UI may display text, such as, but not limited to, status, errors, remediation options for these errors, or instructions. Sample customer instructions may include, but are not limited to, "Once you've completed filling out the check information and signed the back, it's time to view your check," "Select the camera icon in your mobile app to open the camera," "Once you've taken video of the front of the check, flip the check to take video of the back of the check," "Do you accept the funds availability schedule?," "An error occurred while processing the front side of the check, please take additional imagery of the back of the check," "Swipe the Slide to Deposit button to submit the deposit," "Your deposit request may have gone through, but it's still a good idea to hold on to your check for a few days," "keep the check in a safe, secure place until you see the full amount deposited in your account," and "After the deposit is confirmed, you can safely destroy the check." These instructions are provided as sample instructions or comments but any instructions or comments that guide the customer through a remote deposit session or remediation may be included.

Figure 2:
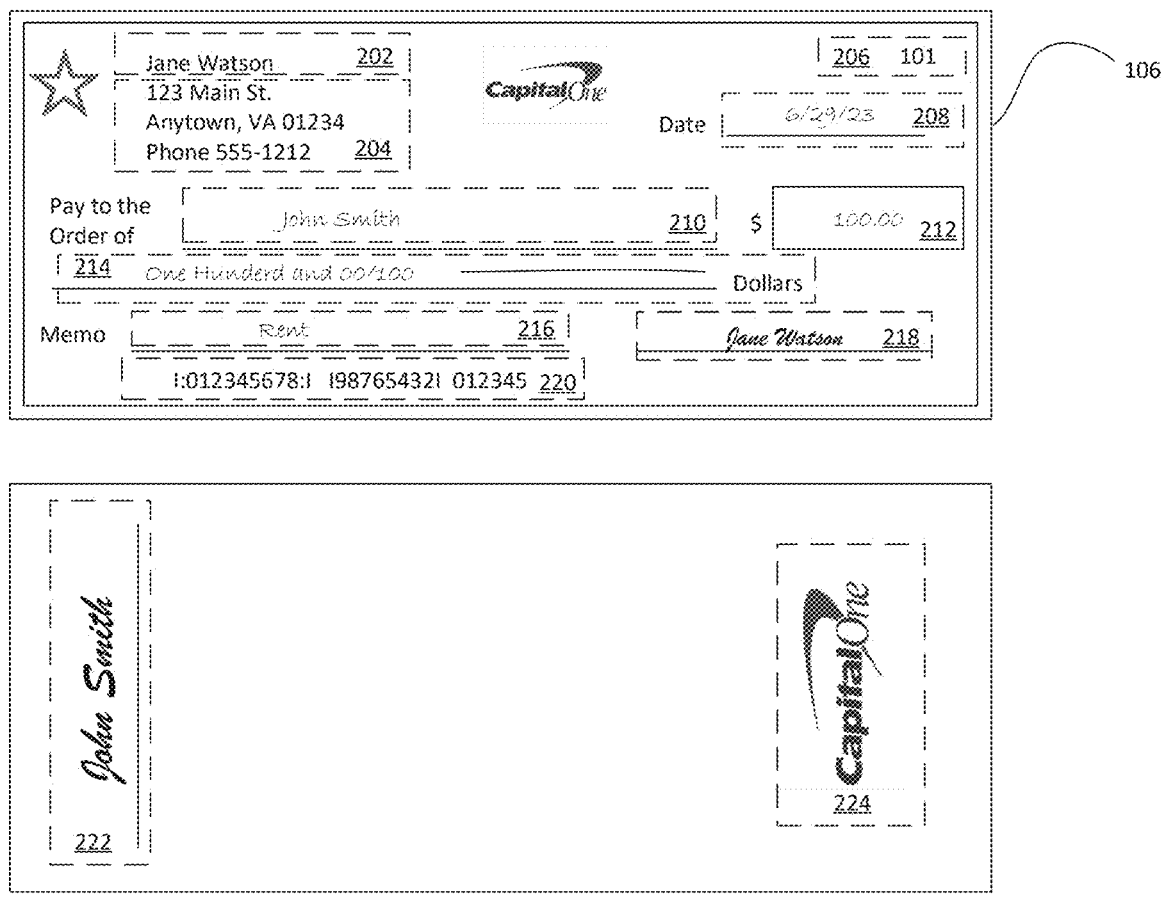
FIG. 2 illustrates example remote deposit OCR segmentation, according to some embodiments and aspects.

FIG. 2 illustrates example remote deposit OCR segmentation, according to some embodiments and aspects. Depending on check type, a check may have a fixed number of identifiable fields. For example, a standard personal check may have front side fields, such as, but not limited to, a payor customer name 202 and address 204, check number 206, date 208, payee field 210, payment amount 212, a written amount 214, memo line 216, Magnetic Ink Character Recognition (MICR) line 220 that includes a string of characters including the bank routing number, the payor customer's account number, and the check number, and finally, the payor customer's signature 218. Back side identifiable fields may include, but are not limited to, payee signature 222 and security fields 224, such as a watermark.

While a number of fields have been described, it is not intended to limit the technology disclosed herein to these specific fields as a check may have more or less identifiable fields than disclosed herein. In addition, security measures may include alternative approaches discoverable on the front side or back side of the check or discoverable by processing of identified information. For example, the remote deposit feature in a mobile banking app running on the mobile computing device 102 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

In one embodiment, OCR processing (e.g., active OCR) of the check imagery may include implementing instructions resident on the customer's mobile device to process each of the field locations on the check as they are detected or systematically (e.g., as an ordered list extracted from a byte array output video stream object). For example, in some aspects, the check imagery may reflect a pixel scan from left-to-right or from top-to-bottom with data fields identified within a frame of the check as they are streamed.

In one non-limiting example, the customer holds their smartphone over a check (or checks) to be deposited remotely while the imagery may be formed into image objects, such as, byte array objects (e.g., frames or partial frames), ranked by confidence score (e.g., quality), and top confidence score byte array objects sequentially OCR processed until data from each of required data fields has been extracted as described in non-provisional patent application Ser. No. 18/503,787 filed Nov. 7, 2023, entitled Burst Image Capture, and incorporated by reference in its entirety herein. Alternatively, the imagery may be a blend of pixel data from descending quality image objects to form a higher quality (e.g., high confidence) blended image that may be subsequently OCR processed, as per non-provisional patent application Ser. No. 18/503,799 filed Nov. 7, 2023, entitled Intelligent Document Field Extraction from Multiple Image Objects, and incorporated by reference in its entirety herein.

In another non-limiting example, fields that include typed information, such as the MICR line 220, check number 206, payor customer name 202 and address 204, etc., may be OCR processed first from the byte array output video stream objects, followed by a more complex or time intensive OCR process of identifying written fields, which may include handwritten fields, such as the payee field 210, written amount 214, payor signature 218, to name a few.

In another example embodiment, artificial intelligence (AI), such as machine-learning (ML) systems, may train a quality model to determine a quality of a frame or partial frame of image data, an OCR model(s) to recognize characters, numerals or other check data within the data fields of the video streamed imagery, or a status/remediation model to predict errors and corresponding successful remediation steps. The various ML models may be resident on the mobile device and may be integrated with or be separate from a banking application (app). The ML models may be continuously updated by future images or transactions used to train the ML model(s).

ML involves computers discovering how they can perform tasks without being explicitly programmed to do so. ML includes, but is not limited to, artificial intelligence, deep learning, fuzzy learning, supervised learning, unsupervised learning, etc. Machine learning algorithms build a model based on sample data, known as "training data," in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific process to capture relationships between concepts (e.g., poor image clarity may lead to one or more errors in image or OCR processing) and a failure history. The classifier (discriminator) is trained to distinguish (recognize) variations. Different variations may be classified to ensure no collapse of the classifier and so that variations may be distinguished.

In some aspects, machine learning models are trained on a remote machine learning platform (e.g., see FIG. 3, element 329 and FIG. 8) using other customer's transactional information (e.g., previous remote deposit transactions). For example, large training sets of remote deposits with check imagery and associated transactional data may be used to normalize prediction data (e.g., specific combination of data points may be an indicator of future errors). Thereafter, a predictive model(s) may classify a specific transaction against the trained predictive model to predict a status, remediation option(s), or instruction(s) that may assist the user to complete the remote deposit process. In one embodiment, the predictive models are continuously updated as new remote deposit financial transactions or check imagery become available.

In some aspects, a ML engine may continuously change weighting of model inputs to increase customer interactions with the remote deposit procedures. For example, weighting of specific data fields or features may be continuously modified in the model to trend towards greater success, where success is recognized by advancement of the remote deposit process passed matters that endanger completion of the process or by completed remote deposit transactions. Conversely, input data field weighting that lowers successful interactions may be lowered or eliminated.

FIG. 3 illustrates a remote deposit system architecture 300, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

As described throughout, a client device 302 (e.g., mobile computing device 102) implements remote deposit processing for one or more financial instruments, such as checks. The client device 302 is configured to communicate with a cloud banking system 316 to complete various phases of a remote deposit as will be discussed in greater detail hereafter.

In various aspects, the cloud banking system 316 may be implemented as one or more servers. Cloud banking system 316 may be implemented as a variety of centralized or decentralized computing devices. For example, cloud banking system 316 may be a mobile device, a laptop computer, a desktop computer, grid-computing resources, a virtualized computing resource, cloud computing resources, peer-to-peer distributed computing devices, a server farm, or a combination thereof. Cloud banking system 316 may be centralized in a single device, distributed across multiple devices within a cloud network, distributed across different geographic locations, or embedded within a network. Cloud banking system 316 can communicate with other devices, such as a client device 302. Components of cloud banking system 316, such as Application Programming Interface (API) 318, file database (DB) 320, as well as backend 322, may be implemented within the same device (such as when a cloud banking system 316 is implemented as a single device) or as separate devices (e.g., when cloud banking system 316 is implemented as a distributed system with components connected via a network).

Mobile banking app 304 is a computer program or software application designed to run on a mobile device such as a phone, tablet, or watch. However, in a desktop application implementation, a mobile banking app equivalent may be configured to run on desktop computers, and web applications, which run in web browsers rather than directly on a mobile device. Apps are broadly classified into three types: native apps, hybrid and web apps. Native applications are designed specifically for a mobile operating system, such as, iOS or Android. Web apps are designed to be accessed through a browser. Hybrid apps may function like web apps disguised in a native container.

Financial instrument imagery may originate from, but is not limited to, live image streams (e.g., series of pixels or frames). A customer using a client device 302, operating a mobile banking app 304 through an interactive UI 306, frames at least a portion of a check (e.g., identifiable fields on front or back of check) within a field of view of a camera 308.

In one aspect, the camera imagery is video streamed as encoded text, such as a byte array. Alternatively, or in addition to, the video is buffered by storing (e.g., at least temporarily) as images or frames in computer memory. For example, live video streamed check imagery from camera 308 is stored locally in image memory 312, such as, but not limited to, a frame buffer, a video buffer, a video streaming buffer, or a virtual buffer.

In some embodiments, OCR system 310, resident on the client device 302, processes the imagery based on the live video streamed check imagery from camera 308 to extract data by identifying specific data located within known sections (non-background) of the check to be electronically deposited. In one non-limiting example, single identifiable fields, such as the payor customer name 202, MICR data field 220 identifying customer and bank information (e.g., bank name, bank routing number, customer account number, and check number), date field 208, check amount 212 and written amount 214, and authentication (e.g., payee signature 222) and security fields 224 (e.g., watermark), etc., shown in FIG. 2, are processed by the OCR system 310.

OCR system 310 communicates data extracted from the one or more data fields during the active OCR operation to cloud banking system 316, shown in FIG. 3. For example, the extracted data identified within these fields is communicated to file database (DB) 320 either through a mobile app server 332 or mobile web server 334 depending on the configuration of the client device (e.g., mobile or desktop). In one aspect, the extracted data identified within these fields is communicated through the mobile banking app 304.

In one embodiment, imagery is processed from camera 308, as communicated from an activated camera over a period of time, until an OCR operation (e.g., active OCR) has been completed. For example, a plurality of images (e.g., frames), or partial images (e.g., blocks), are processed by OCR system 310 to identify as many data fields as possible. Subsequently, the additional images may be processed by OCR system 310 to extract any data fields missing from the first image OCR and so on until all data fields from the check have been captured. Alternatively, or in addition to, specific required data fields (e.g., amount, MICR, etc.) may be identified first in a first OCR of a first image or partial image, followed by subsequent data fields (e.g., signature) in subsequent mages.

In a first non-limiting example, an interactive status platform 314 may include instructions or code that may be configured to continuously track and generate a multilevel real-time status and remediation, and may be displayed on Interactive UI 306. The interactive status platform instructions may be executed by a local processor, by a remote server system (e.g., cloud banking system 316), or by a combination of both. In one aspect, the interactive status platform 314 may be executed by instructions from an instruction set of the mobile banking application 304. Alternatively, or in addition to, the interactive status platform 314 may be a thin client (not shown) resident on the client device 302 and processing transaction status and remediation actions locally with assistance from cloud banking system 316. For example, a processor (e.g., CPU) implements at least a portion of remote deposit functionality using resources stored on a remote server instead of a localized memory. The thin client connects remotely to the server-based computing environment (e.g., cloud banking system 316) where applications, sensitive data, and memory may be stored.

As will be described in greater detail in FIG. 4, in one example embodiment, the interactive status platform 314 is configured, at a high level, to display an interactive UI 306 as a three icon interface with drop down menus for one or more remediation steps that may be performed under the three icons. Each if the icons may represent a stage in the remote deposit process. For example, a first stage may be an initial deposit request stage, a second stage may represent mid-stream processing and a third stage may represent post deposit processing.

In one embodiment, a flip detector (not shown) detects a check position sequence of front facing, flip, and back facing. Various mechanisms may detect this sequence based on any of, or a combination of, a shape of an overlaid virtual background, position, vision, sound, or multiple document analytics. One example of flip detection is further described in U.S. application Ser. No. 18/584,453, entitled "Managed Video Capture," filed Feb. 22, 2024, and incorporated by reference in its entirety.

Backend 322, may include one or more system servers processing banking deposit operations in a secure environment. These one or more system servers operate to support client device 302. API 318 is an intermediary software interface between mobile banking app 304, installed on client device 302, and one or more server systems, such as, but not limited to the backend 322, as well as third party servers (not shown). The API 318 is available to be called by mobile clients through a server, such as a mobile edge server (not shown), within cloud banking system 316. File DB stores files received from the client device 302 or generated as a result of processing a remote deposit.

Profile module 324 retrieves customer profiles associated with the customer from a registry after extracting customer data from front or back images of the financial instrument. Customer profiles may be used to determine deposit limits, historical activity, security data, or other customer related data.

Validation module 326 generates a set of validations including, but not limited to, any of: mobile deposit eligibility, account, image, transaction limits, duplicate checks, amount mismatch, MICR, multiple deposit, etc. While shown as a single module, the various validations may be performed by, or in conjunction with, the client device 302, cloud banking system 316 or third party systems or data. Validations may detect errors in any step of the remote deposit process, to include post deposit activities.

Customer Accounts 328 (consistent with customer's accounts 408) includes, but is not limited to, a customer's banking information, such as individual, joint, or commercial account information, balances, loans, credit cards, account historical data, etc.

ML Platform 329 may generate a trained predictive model to dynamically predict a status, remediation option(s), or instruction(s) that may assist the user or the system to complete the remote deposit process. The ML model may dynamically and continuously predict and update a status, remediation option, or instruction based on, but not limited to, problems associated with banking application interactions, device errors, communication network issues, imaging issues, OCR processing errors, missing or incorrect information, backend financial processing, or actions taken by the user (e.g., improper actions, or successful or failed remediation efforts). In addition, the ML model may be processed locally on the client device 302, remotely on servers located at backend 322, cloud banking system 316, or any processing combination. Other ML models may include, but are not limited to, a quality confidence model, and/or an OCR model (e.g., active OCR) using a ML engine. This disclosure is not intended to limit the ML Platform 329 to only these models, as it may also include, but not be limited to, remote deposit models, risk models, funding models, security models, etc.

When remote deposit status information is generated, it is passed back to the client device 302 through API 318 where it is formatted for communication and display on the client device 302 and may, for example, communicate an extended or delayed funds availability schedule for display or rendering on the customer's device through the Interactive UI 306. In this scenario, a delay in funds availability may be considered detrimental (e.g., cause for cancellation) to the remote deposit process by the user and therefore may need remediation instructions to reduce or remove the delay. The Interactive UI 306 may instantiate the status, remediation options, or instructions as images, graphics, audio, additional content, etc.

Pending deposit 330 includes a profile of a potential upcoming deposit(s) based on an acceptance by the customer through Interactive UI 306 of a deposit according to given terms. If the deposit is successful, the flow creates a record for the transaction and this function retrieves a product type associated with the account, retrieves the interactions, and creates a pending check deposit activity. At this point, the interactive status platform enters a post-deposit status and remediation phase.

Alternatively, or in addition to, one or more components of the remote deposit process may be implemented within the client device 302, third party platforms, the cloud-based banking system 316, or distributed across multiple computer-based systems. In one technical improvement over current processing systems, the remote deposit status is provided mid-stream, prior to completion of the deposit. In this approach, the customer may remediate or optionally terminate the process prior to completion if they are dissatisfied with the remote deposit status.

In one aspect embodiment, remote deposit system 300 tracks customer behavior. For example, did the customer complete a remote deposit operation or did they cancel the request? Behaviors may include the user taking remediation steps that were successful and led to a completed transaction, or were not successful and ultimately led to cancellation. In some aspects, the completion of the remote deposit operation reflects a successful outcome, while a cancellation reflects a failed outcome. In some aspects, this customer behavior, not limited to success/failure, may be fed back to the ML platform 329 to enhance future training of any of the ML models disclosed herein. For example, in some embodiments, one or more inputs to the ML models may be weighted differently (higher or lower) to effect a predicted higher successful outcome.

The technical solution disclosed herein allows active OCR processing of highest quality live imagery, as scored by the ML trained confidence models, or corrected by user remediation (e.g., record additional imagery), without first requiring communication of an image capture to a remote OCR processing system. This solution set improves the quality of the OCR process, accelerates the remote check deposit process and allows mid-stream alterations or improvements, for example, real-time image quality guidance or customer inputs (e.g., mid-stream cancelation).

Figure 4:
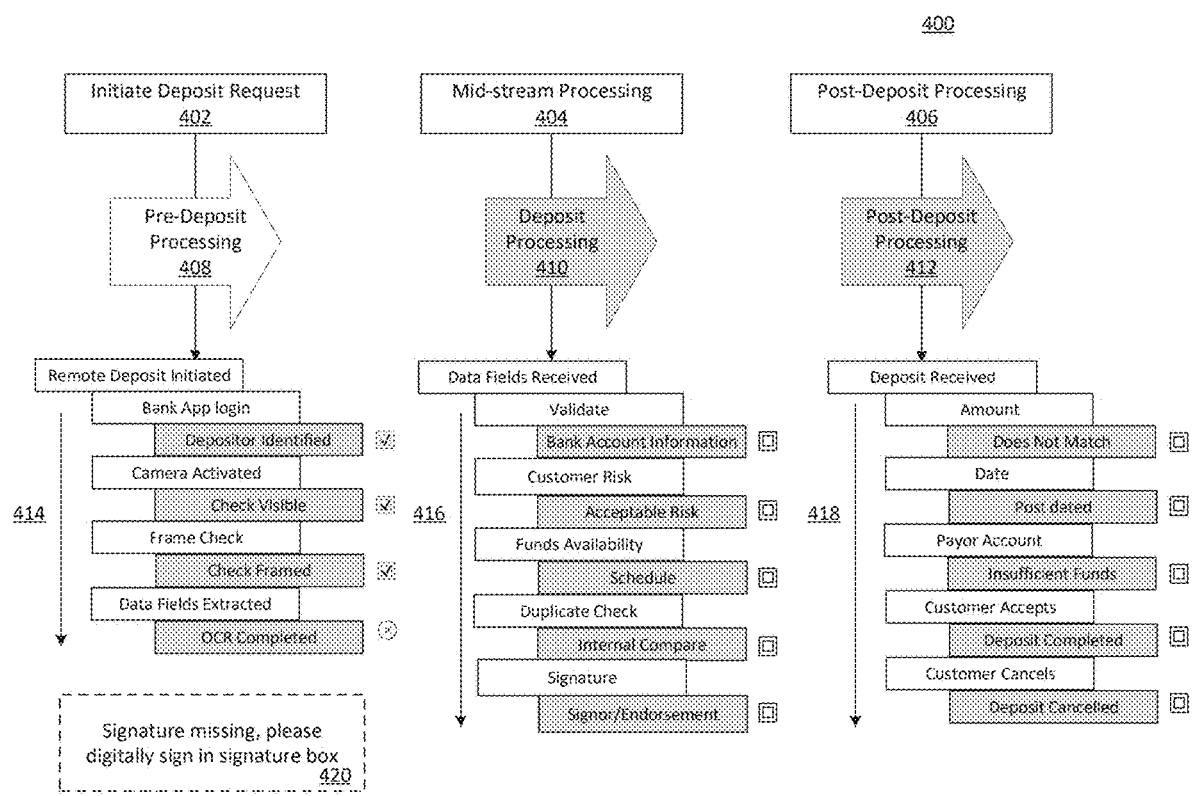
FIG. 4 illustrates an example interactive user interface diagram for a remote deposit system, according to some embodiments and aspects.
Figure 5:
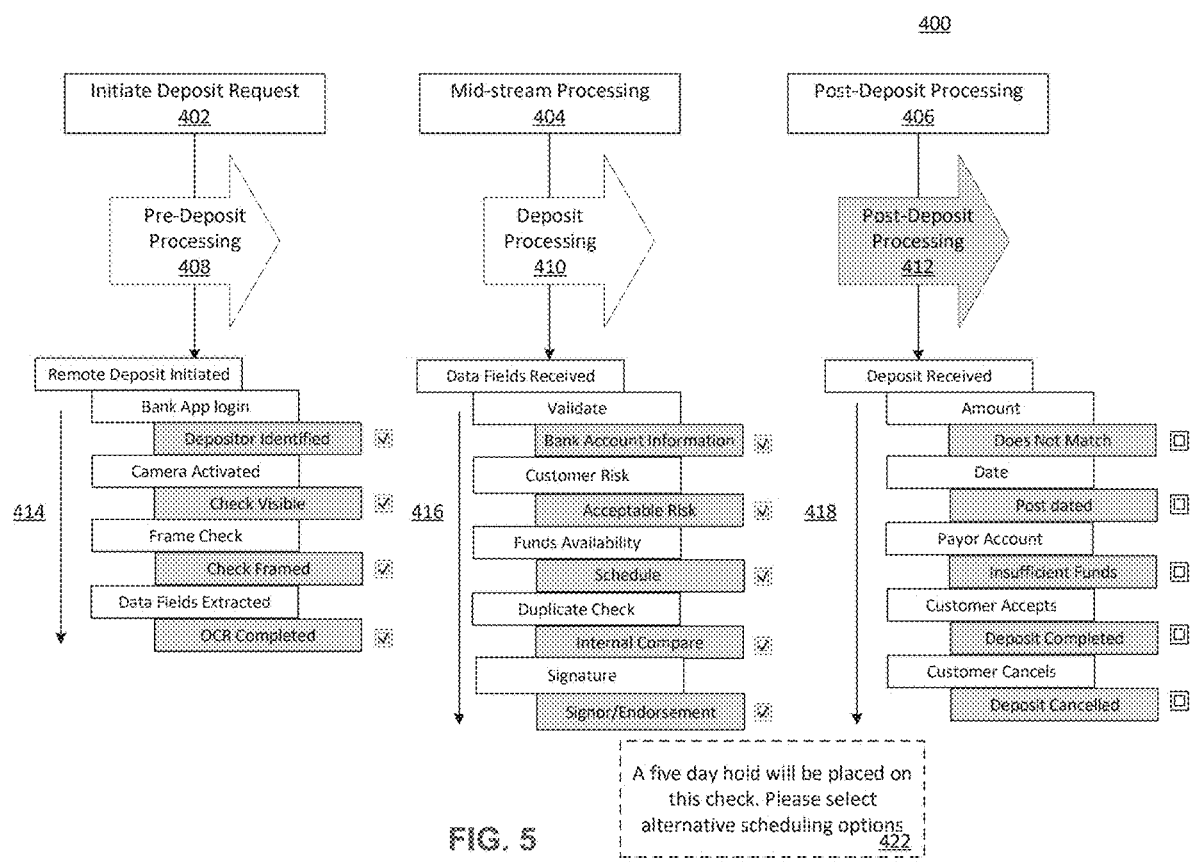
FIG. 5 illustrates an example interactive user interface diagram for a remote deposit system, according to some embodiments and aspects.
Figure 6:
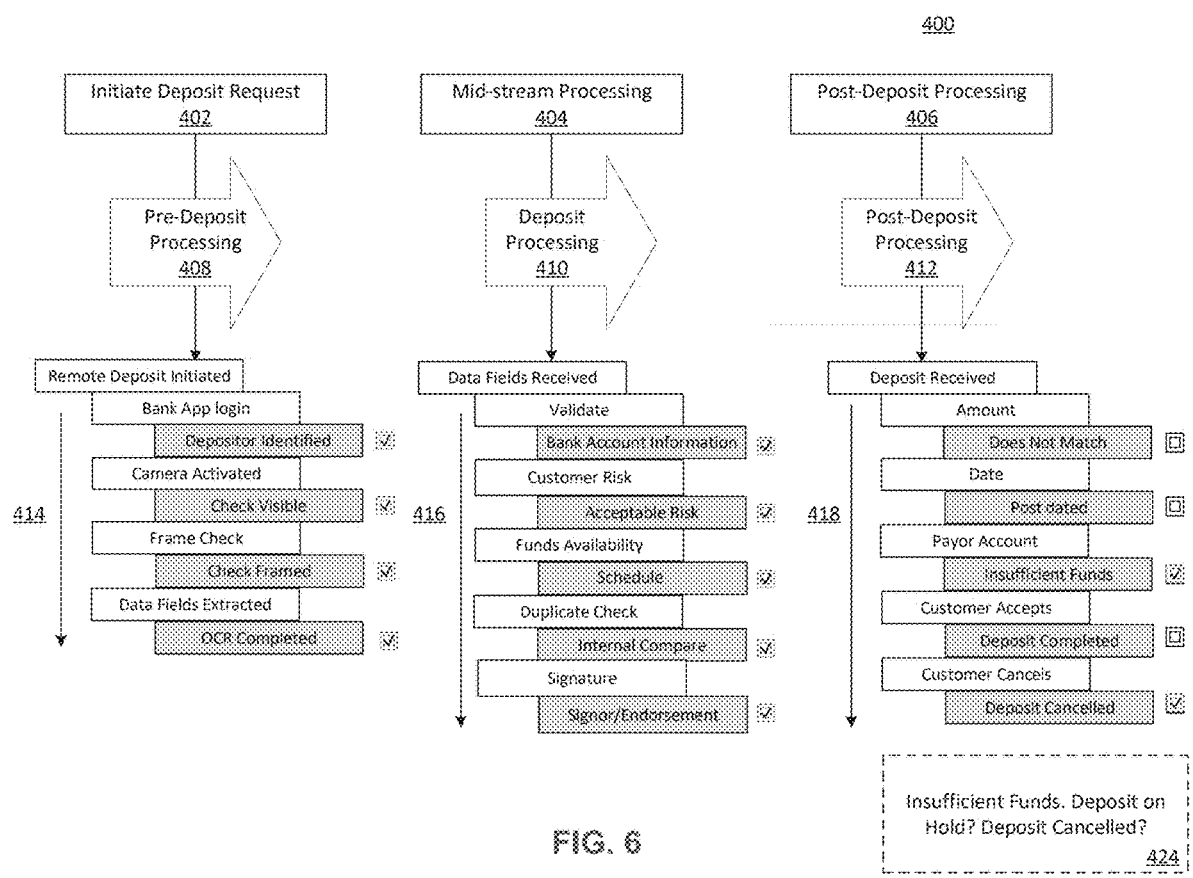
FIG. 6 illustrates an example interactive user interface diagram for a remote deposit system, according to some embodiments and aspects.

FIGS. 4-6 illustrate an example of an interactive status UI 314. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

In one example embodiment, interactive status platform 314 is configured, at a high level, to display an interactive UI 306 as a three icon interface. Each high level icon may include multi-level drop down menus 414, 416 and 418 for one or more tasks, system processes, errors or remediation steps that may be performed under a respective one or plurality of the three icons (e.g., a similar task may be performed at various stages). Each of the icons may represent a stage in the remote deposit process. For example, the remote deposit process may be segmented into stages. A first stage may be an initial deposit request stage 402, where a pre-deposit processing status indicator 408 displays an updated status progress as the remote deposit progresses through the various initial steps. A second stage may represent mid-stream processing 404, where a deposit processing status indicator 410 displays a status of deposit processing. And a third post-deposit stage 406 stage may represent post-deposit processing 412. For simplicity purposes only, FIG. 4 will be described for a single matter occurring during the initial deposit request stage 402. FIG. 5 will be described for a single matter occurring during the mid-stream processing 404 stage. FIG. 6 will be described for a single matter occurring during the post-deposit processing stage 406. However, the menu items described herein may be implemented at any stage or task and include any number of tasks per stage, errors per stage, remediation steps per stage, and status updates. As illustrated, in FIG. 4, the mid-stream processing 404 and post-deposit stage 406 status indicators are grayed out, indicating that they are inactive during the pre-deposit processing. In another aspect, all tasks, statuses, errors, and remediation steps may be selectively or simultaneously displayed. Alternatively, or in addition to, tasks, errors and remediation tasks, or portions thereof, may overlap between multiple stages.

While each high level status indicator may be continuously updated with a selected color, such as green for no issues and red for issues, in one aspect, a user may hover over a high level status indicator with a cursor (e.g., stylus or user's finger) to obtain addition detail of an error or to initiate remediation steps. In one aspect, multi-level drop down menu items may also be reviewed for an associated specific status, obtain an additional drop down menu item, or to interact with the UI to initiate or select remediation steps. In some aspects, as previously described, color may be used to indicate status, rather than, or in addition to, a mark next to the task (e.g., checked box).

In a non-limiting example, a first stage may be an initial deposit request stage 402, where a "Pre-deposit Processing" status indicator 408 displays an updated status progress as the remote deposit progresses through the various initial steps when the remote deposit is initiated, such as, but not limited to logging into the banking app, selecting the make a deposit box, initiating a recording of check imagery, and OCR extracting of check data fields. As shown, drop down menu items 414 progress through a series of user or client device/system steps. For example, when a user opens their mobile banking app, the associated UI is rendered on their display and they enter their login information. Successful completion of this task may be represented by the mobile banking app providing the user's "bank account information" as metadata to the remote deposit process (shown with a checked box). In response to the user requesting to deposit a check, a second task activates the camera and success is represented by a "check visible" status (shown with a checked box). The system may check to determine if the check is at least partially in the frame with success represented by a "check framed" status (shown with a checked box). As imagery is streamed, data fields from the check are OCR processed to extract these fields and communicate them to the cloud banking system 316 with success represented by an "OCR completed" status. However, in this example, the corresponding task status box displays an "x", indicating a failure. Remediation step 420 may subsequently be displayed to user on the UI with a message, such as, "Signature missing, please digitally sign in signature box," which may generate a signature box on the UI and, upon completion, would change the status indicator to a checked status and advance the process to the mid-stream processing 404. Alternatively, the remediation may be to physically sign and hold the camera over back side of check. The user instruction(s) may be provided to the user as images, graphics, audio, additional content, etc. At this point, the status would revert to tracking the camera activated task and show the subsequent tasks as not yet completed. Upon completion of the extraction of the signature, all tasks will display a checked status as the remote deposit process advances to the pre-deposit tasks and processes.

In some aspects, the UI may display a status of user tasks, device tasks, system tasks, processing completion, a percentage of completion, or a combination of these elements.

FIG. 5 illustrates an example interactive status UI 314. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

Continuing with the FIG. 4 example embodiment, the interactive status platform 314 is configured to display a "Deposit Processing" status indicator 410 that displays a status of mid-stream processing and may further include drop down menus 416 for one or more tasks, errors, or remediation steps that may be performed during mid-stream processing 404. While illustrated for a few example tasks, the menu items described herein may be implemented at any stage or task and include any number of tasks per stage, errors per stage, remediation steps per stage, and status updates. In one aspect, the post-deposit stage 406 status indicator is grayed out, indicating that it is inactive during the deposit processing. In another aspect, all tasks, statuses, errors, and remediation steps may be simultaneously displayed. Alternatively, or in addition to, tasks, errors and remediation tasks may overlap between multiple stages.

In a non-limiting example, "Deposit Processing" status indicator 410 displays an updated status progress as the remote deposit progresses through the various steps following completion of the OCR process to extract data fields from the check. As shown, drop down menu items 416 may include tasks, such as, but not limited to, validating various ones of the extracted data fields. In a non-limiting validation example, the payee's bank account information may be validated by comparing their login information to their name and signature data fields extracted from the check imagery. Successful completion of this task by the validation module 326 may be represented by the mobile banking app providing the user's "bank account information" as metadata to the remote deposit process (shown with a checked box). In response to validating the extracted data fields, a second task evaluates customer risk, with success represented by an "acceptable risk" status (shown with a checked box). The system may check to determine a corresponding funds availability, based at least partially on the customer risk, where success is represented by a funds availability "schedule" status (shown with a checked box). As a result of the generated funds availability schedule, a status message 422 displays: "A five day hold will be placed on this check." While not an error, this hold period may be fatal to a successful completion of the deposit process. For example, the depositor may determine this to be too long of a time period to wait for funds. A remediation step may also be provided to the depositor on the status message 422 (or as a separate message), such as, "Please select alternative scheduling options." The instructions may be provided to the user as images, graphics, audio, additional content, etc. Upon completion of the mid-stream processing stage tasks, all tasks will display a checked status as the remote deposit process advances to the post-deposit tasks and processes. Other example deposit processing tasks illustrated may include duplicate check evaluations and signature/endorsement checks.

In some aspects, the UI may display a status of user tasks, device tasks, system tasks, processing completion, a percentage of completion, or a combination of these elements.

FIG. 6 illustrates an example interactive status UI 314. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art.

Continuing with the FIG. 4 example embodiment, the interactive status platform 314 is configured to display a "Post-Deposit Processing" status indicator 412 that displays a status of post-deposit processing and may further include drop down menus 418 for one or more tasks, errors or remediation steps that may be performed during post-deposit processing 406. While illustrated for a few example tasks, the menu items described herein may be implemented at any stage or task and include any number of tasks per stage, errors per stage, remediation steps per stage, and status updates. In one aspect, all tasks, statuses, errors, and remediation steps may be simultaneously displayed. Alternatively, or in addition to, tasks, errors and remediation tasks may overlap between multiple stages.

In a non-limiting example, "Post-deposit Processing" status indicator 412 displays an updated status progress as the remote deposit progresses through the various steps following completion of the deposit. As shown, drop down menu items 418 may include tasks, such as, but not limited to, checking a written amount against a numerical amount as provided by the extracted data fields from the check. In another example task, the extracted date information may be compared to the deposit date to check for post-dated checks. In another example task, the cloud banking system 322 may check for sufficient funds in the payor account to cover the amount of the check. As shown, if insufficient funds exist to cover the amount of the check a status message 424 may be displayed to the depositor. The message may indicate a "hold" on the funds and provide an option for the depositor to contact the payor or simply cancel the remote deposit process. The instructions may be provided to the user as images, graphics, audio, additional content, etc. Conversely, if the remote deposit status has no errors or funding issues, the user may accept the deposit and the remote deposit process will be completed.

Unlike current systems, the technology described herein allows mid-stream status updates and user interaction to affect the remote deposit process. These current systems and processes may be inefficient and consume client, system, and network resources that otherwise could be allocated to other tasks. Alternatively, without an awareness of potential problems or an ability to rectify these problems, a frustrated user may take their deposit to another financial institution, causing a potential duplicate presentment or fraud issue.

Figure 7A:
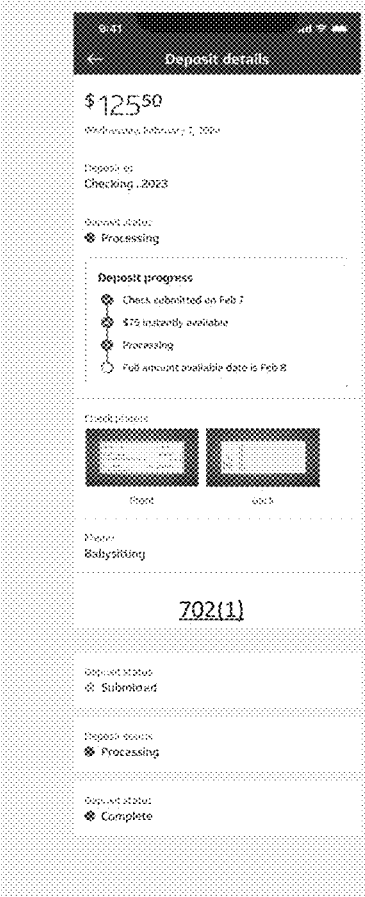
FIGS. 7A, 7B and 7C illustrate example interactive user interface diagrams for a remote deposit system, according to some embodiments and aspects.
Figure 7B:
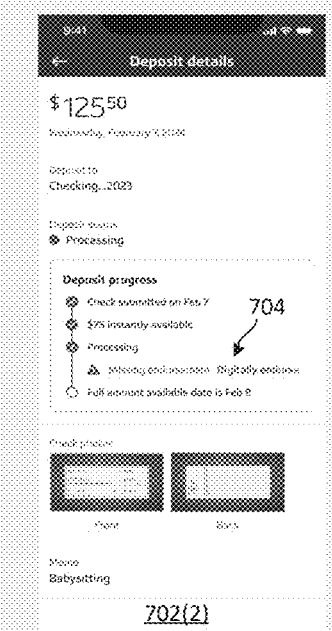
Figure 7C:
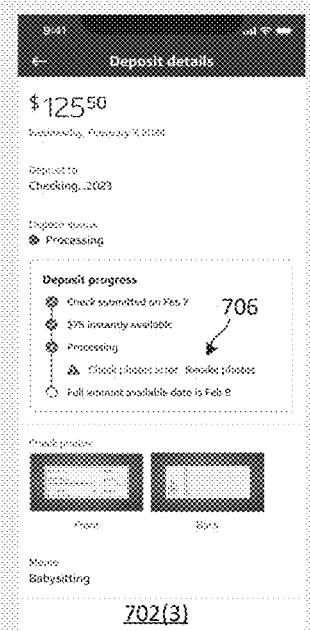

FIGS. 7A, 7B, and 7C illustrate example aspects of an interactive status UI 314. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIGS. 7A, 7B, and 7C, as will be understood by a person of ordinary skill in the art.

In one alternative example embodiment, interactive status platform 314 is configured to display a remote deposit status through an interactive UI 306 configured as a single graphic with selected one or more tasks, system processes, errors or remediation steps illustrated. The selection of tasks may be based on recency of completed tasks or reflect important status information. In some aspects, these displayed tasks may also be selected by a ML model to reflect status information that, when presented to the depositor, improves successful deposit completions.

As shown in FIG. 7A, in interface 702(1), a remote deposit of a check, in an amount of $125.50 for babysitting, is in progress. At this point in the process, the check imagery (front and back images shown) has been submitted, a funds availability is shown ("$75 instantly available"), and the deposit is still "processing".

As shown in FIG. 7B, in interface 702(2), a remote deposit of a check, in an amount of $125.50 for babysitting, is in progress. At this point in the process, the check imagery (front and back images shown) has been submitted, a funds availability is shown ("$75 instantly available"), and the deposit is still "processing". However, a status message 704 indicates that an "endorsement is missing" and displays a remediation step of requesting a digital signature. As previously described, the UI may generate a signature box and, upon receiving the digital signature, would change the status and advance the process.

As shown in FIG. 7C, in interface 702(3), a remote deposit of a check, in an amount of $125.50 for babysitting, is in progress. At this point in the process, the check imagery (front and back images shown) has been submitted, a funds availability is shown ("$75 instantly available"), and the deposit is still "processing". However, a status message 706 indicates that there is an error in the check imagery and displays a remediation step of requesting the depositor to retake the imagery.

Similar to the multiple graphic UI example, the technology described herein allows mid-stream status updates and user interaction to affect the remote deposit process. These current systems and processes may be inefficient and consume client, system, and network resources that otherwise could be allocated to other tasks. Alternatively, without an awareness of potential problems or an ability to rectify these problems, a frustrated user may take their deposit to another financial institution, causing a potential duplicate presentment or fraud issue.

Figure 8:
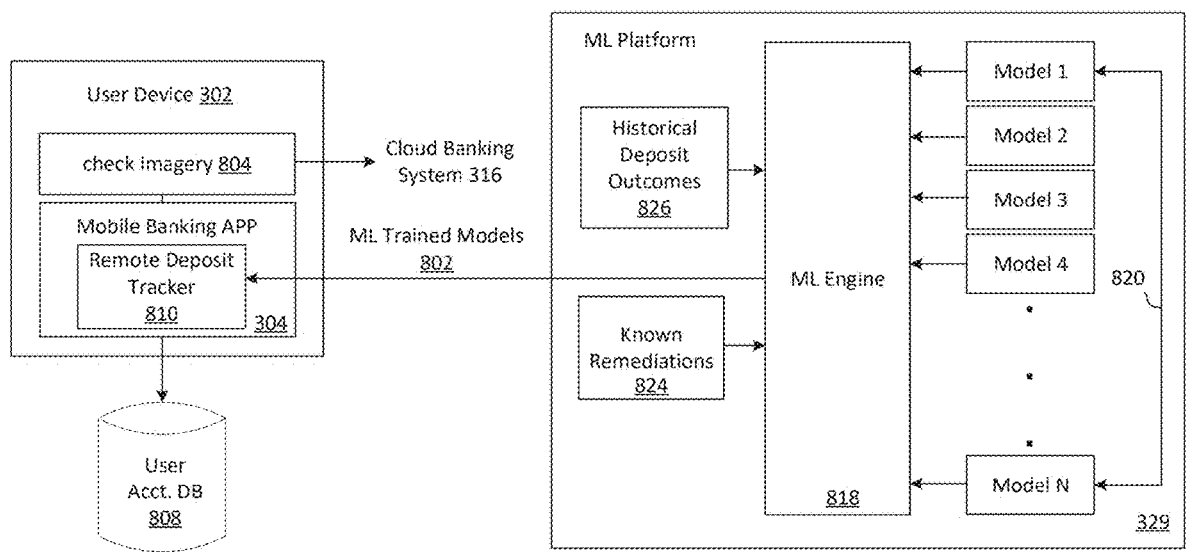
FIG. 8 illustrates a block diagram of a ML system, according to some embodiments and aspects.

FIG. 8 illustrates a block diagram of a ML system 800, according to some embodiments and aspects. A remote deposit tracker 810 implementation may include one or more system servers processing various banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 8, as will be understood by a person of ordinary skill in the art.

In some aspects, a remote deposit tracker model 810 may be processed locally on the client device 302 to improve check data deposit performance, such as accuracy, quality and speed, completion, to name a few. In various aspects, remote deposit tracker model 810 may be a standalone model or be integrated within mobile banking app 304 (as shown), or within OCR system 310. ML models (1-N) 820 may singularly, or collectively, implement any of, but are not limited to, a ML predictive model for predicting errors in the remote deposit sequence, a ML model for predicting changes in status in a remote deposit sequence, a ML model for predicting one or more remediations that will increase a likelihood of completing the remote deposit sequence, a ML model for selecting remote deposit status indicators, a ML model for image quality scoring, and a ML model for predicting characters/numeral in an OCR process.

Machine learning may involve computers learning from data provided so that they carry out certain tasks. For more advanced tasks, it can be challenging for a human to manually create the needed algorithms. This may be especially true of teaching approaches to correctly identify patterns. The discipline of machine learning therefore employs various approaches to teach computers to accomplish tasks where no fully satisfactory algorithm is available. In cases where vast numbers of potential answers exist, one approach, supervised learning, is to label some of the correct answers as valid or successful. For example, a remediation action may be correlated with a deposit completion score based on previously similar remediations. This may then be used as training data for the computer to improve the algorithm(s) it uses to determine future successful outcomes.

Training of any of the described ML models may occur remotely from the client device 302 (e.g., in ML platform 329) and be communicated to the client device 302 as one or more ML model(s) 820 are trained and updated. Training may include exposing the ML models to the data of hundreds, thousands, or more of historical image data and corresponding deposit outcomes 826, where specific imagery with labeled errors, status indicators, known remediation's 824, and subsequent success of deposit completions, may be included in a supervised model build. Weighting thresholds may be selectable and varied during the training process to generate an optimized threshold based on a historical correlation with successful advancement of the remote deposit process (e.g., overcoming matters that endanger the completion of the remote deposit process) or deposits. Trained ML models 820 may each have varied metadata weightings, performance weightings, or quality weightings, but are not limited to these parameter weightings. One skilled in ML would appreciate that any of the parameters used in the remote deposit tracking process, such as, but not limited to, performance targets may have weighting varied without departing from the scope of the technology disclosed herein. In one non-limiting example, the metadata may include time, such as, but not limited to, the time to complete a task, a total time for remediation, amount of time to advance the remote deposit process after encountering a matter, or total time to complete a remote deposit. In this scenario, the time parameter is weighted higher, with categorization of classes into different time periods. For example, remote deposit tracking of advancement or completion outcomes may be classified into short, medium, and long time periods, with continuously weighting adjustments to trend towards the shorter time periods. In another non-limiting example, metadata is a user's acceptance or denial, through the interactive UI, of completion of the remote deposit. In this scenario, the acceptance is weighted higher to train the model to trend towards successful outcomes.

As shown, a series of desired models 820, 1-N, may be fed into the ML Engine 818 as predictor models to build a remote deposit tracker model 810 from a set of ML models trained on specific imagery, tasks, statuses, remediations, and other transactional data, to name a few. The ML model(s) 820(1-N) may be trained and continuously improved by analyzing relative success over a large data set, where success is measured by advancement of the remote deposit process or its final completion. ML models 820(1-N) may be focused to generate queries for a specific performance level, for example remediating an issue in a minimum time (e.g., less than some number of seconds/minutes).

Check Imagery 804 received from the client device, including, for example, byte object arrays used in the OCR process, may be stored in the User Account DB 808. User Account DB 808 may also store user profile information that may be used with a remote deposit platform to provide account and profile information based on associated identifiers (IDs). Additionally, as specific funds availability schedules are presented to the user, for example, as rendered on their user device 302, through mobile banking app 304, the historical information may be added to the user's profile, and further be stored in the User Account DB 808.

Alternatively, or in addition to, one or more components of the ML platform 329 may be implemented within the user's mobile device, third party platforms, and a cloud-based system, or distributed across multiple computer-based systems.

The various aspects solve at least the technical problems associated with errors that occur mid-stream. The various embodiments and aspects described by the technology disclosed herein are able to remediate or advance a remote deposit sequence mid-experience, before the customer completes the deposit and without requiring the customer to start over or cancel the transaction.

This solution improves the quality of the check processing process, accelerates the remote check deposit process, and allows mid-video stream alterations or improvements, for example, real-time image quality guidance or customer inputs (e.g., mid-video stream remediations), before the customer completes the deposit, as well as the other technical advantages described throughout this disclosure.

Example Computer System

Figure 9:
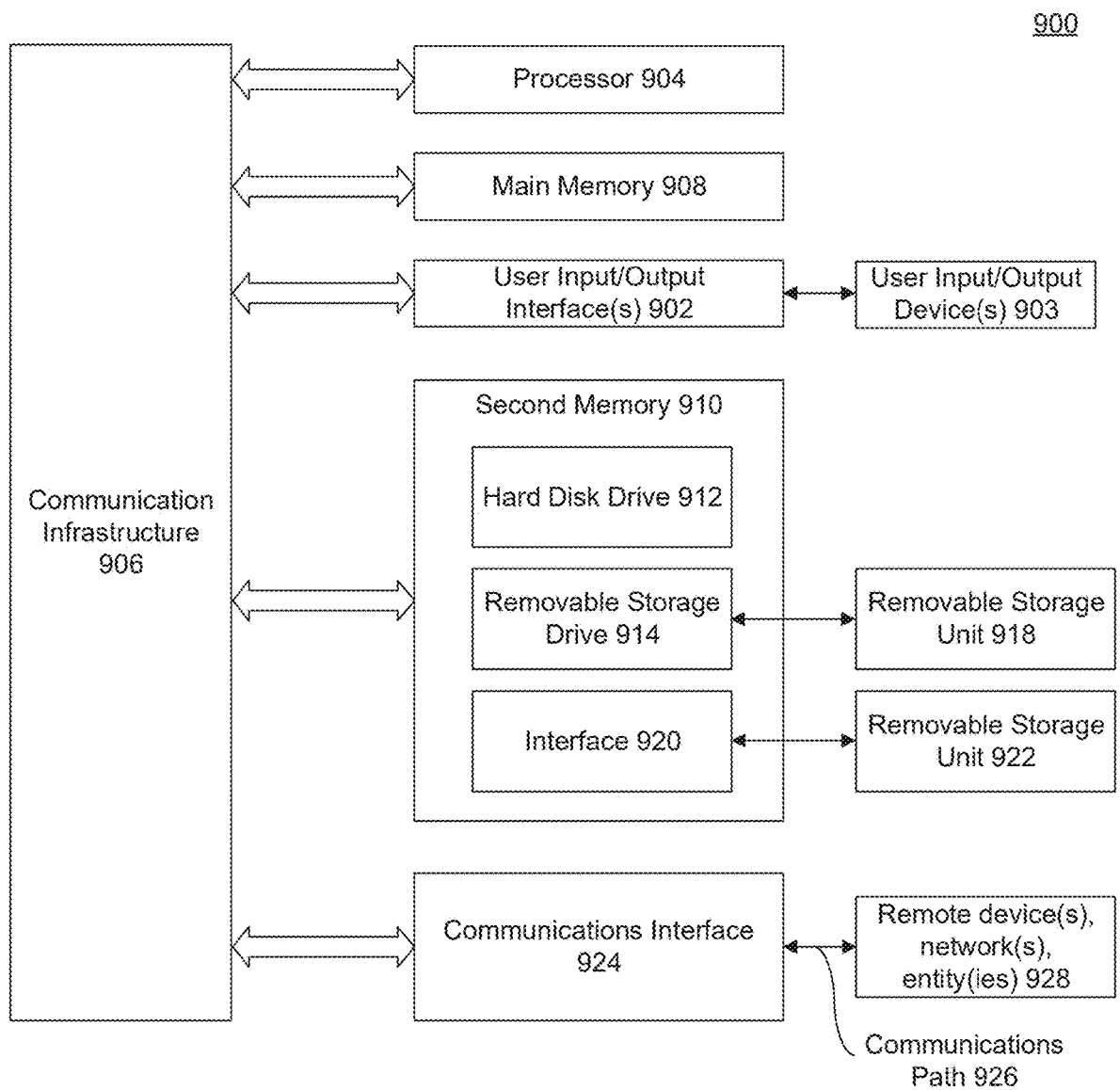
FIG. 9 illustrates an example computer system useful for implementing various embodiments and aspects.

FIG. 9 depicts an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof. For example, the example computer system may be implemented as part of mobile computing device 102, client device 302, cloud banking system 316, etc. Cloud implementations may include one or more of the example computer systems operating locally or distributed across one or more server sites.

Computer system 900 may include one or more processors (also called central processing units, or CPUs), such as a processor 904. Processor 904 may be connected to a communication infrastructure or bus 906.

Computer system 900 may also include user input/output device(s) 902, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 916. Removable storage unit 916 may include a computer usable or readable storage device having stored thereon computer software (control logic) and/or data. Removable storage unit 916 may be a floppy disk, magnetic tape, compact disk, DVD, optical storage disk, and/any other computer data storage device. Removable storage drive 914 may read from and/or write to removable storage unit 916.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 929). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 916 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for remote deposit process using a client device, comprising:
    activating, on the client device, a remote deposit application;
    activating, based on receiving a user request to initiate a remote deposit from the remote deposit application, an interactive user interface (UI), wherein the interactive UI provides at least a status indicator of the remote deposit;
    predicting, by a first trained machine learning model, an occurrence of a remote deposit matter preventing advancement of the remote deposit process;

predicting, by a second trained machine learning model, one or more remote deposit remediation tasks to overcome the remote deposit matter;

modifying a weighting of metadata during training of the second trained machine learning model to trend towards greater success, wherein the greater success is recognized by an advancement or completion of the remote deposit process, and wherein the metadata includes any of: a time to complete a task, a time to complete the one or more remote deposit remediation tasks, a time for advancing the remote deposit process after encountering a matter, or a total time to complete the remote deposit process;

displaying, on the interactive UI, the one or more remote deposit remediation tasks; and advancing, based on the user completing the one or more remote deposit remediation tasks, the remote deposit process; and wherein the metadata further includes a user acceptance or denial, through the interactive UI, of the completion of the remote deposit process.

2. The computer-implemented method of claim 1, further comprising segmenting the remote deposit process into a plurality of stages and displaying a respective status indicator for each of the plurality of stages.

3. The computer-implemented method of claim 2, further comprising displaying one or more drop-down menus of one or more tasks or status indicators occurring during a respective one of the plurality of stages.

4. The computer-implemented method of claim 1, further comprising training the first trained machine learning model and the second trained machine learning model on historical remote deposit transactions comprising one or more of: remote deposit transactions, associated remote deposit matters, associated remote deposit remediation tasks, or associated remote deposit process outcomes.

5. The computer-implemented method of claim 1, wherein the first trained machine learning model and the second trained machine learning model are combined into a single ML model.

6. The computer-implemented method of claim 1, further comprising continuously modifying weighting of metadata during training of the first trained machine learning model to trend towards greater success, where success is recognized by identification of the matters that endanger the advancing of the remote deposit process.

7. A system, comprising:
a memory; and
at least one processor coupled to the memory and configured to:
activate, based on receiving a user request to initiate a remote deposit from a remote deposit application, an interactive user interface (UI), wherein the interactive UI provides at least a status of the remote deposit;
predict, by a first trained machine learning model, an occurrence of a remote deposit matter preventing advancement of the remote deposit process;
predict, by a second trained machine learning model, one or more remote deposit remediation tasks to overcome the remote deposit matter;
modify a weighting of metadata during training of the second trained machine learning model to trend towards greater success, wherein the greater success is recognized by an advancement or completion of the remote deposit process, and wherein the metadata includes any of: a time to complete a task, a time to complete the one or more remote deposit remediation tasks, a time for advancing the remote deposit process after encountering a matter, or a total time to complete the remote deposit process;

display, on the interactive UI, the one or more remote deposit remediation tasks; and advance, based on the user completing the one or more remote deposit remediation tasks, the remote deposit process; and wherein the metadata further includes a user acceptance or denial, through the interactive UI, of the completion of the remote deposit process.

8. The system of claim 7, further configured to segment the remote deposit process into a plurality of stages and display a respective status indicator for each of the plurality of stages.

9. The system of claim 8, further configured to display one or more drop-down menus of one or more tasks or status indicators occurring during a respective one of the plurality of stages.

10. The system of claim 7, further configured to train the first trained machine learning model and the second trained machine learning model on historical remote deposit transactions comprising on one or more of: remote deposit transactions, associated remote deposit matters, associated remote deposit remediation tasks, or associated remote deposit process outcomes.

11. The system of claim 7, wherein the first trained machine learning model and the second trained machine learning model are combined into a single ML model.

12. The system of claim 7, further configured to continuously modify weighting of metadata during training of the first trained machine learning model to trend towards greater success, where success is recognized by identification of the matters that endanger the advancing of the remote deposit process.

13. A non-transitory computer-readable device having instructions stored thereon that, when executed by at least one computing device, cause the at least one computing device to perform operations comprising:
activating a remote deposit application;
activating, based on receiving a user request to initiate a remote deposit from the remote deposit application, an interactive user interface (UI), wherein the interactive UI provides at least a status of the remote deposit;
predicting, by a first trained machine learning model, an occurrence of a remote deposit matter preventing advancement of the remote deposit process;
predicting, by a second trained machine learning model, one or more remote deposit remediation tasks to overcome the remote deposit matter;
modifying a weighting of metadata during training of the second trained machine learning model to trend towards greater success, wherein the greater success is recognized by an advancement or completion of the remote deposit process, and wherein the metadata includes any of: a time to complete a task, a time to complete the one or more remote deposit remediation tasks, a time for advancing the remote deposit process after encountering a matter, or a total time to complete the remote deposit process;
displaying, on the interactive UI, the one or more remote deposit remediation tasks; and
advancing, based on the user completing the one or more remote deposit remediation tasks, the remote deposit process; and wherein the metadata further includes a user acceptance or denial, through the interactive UI, of the completion of the remote deposit process.

14. The non-transitory computer-readable device of claim 13, the operations further comprising training the first trained machine learning model and the second trained machine learning model on historical remote deposit transactions comprising on one or more of: remote deposit transactions, associated remote deposit matters, associated remote deposit remediation tasks, or associated remote deposit process outcomes.

* * * * *